Figure 1:
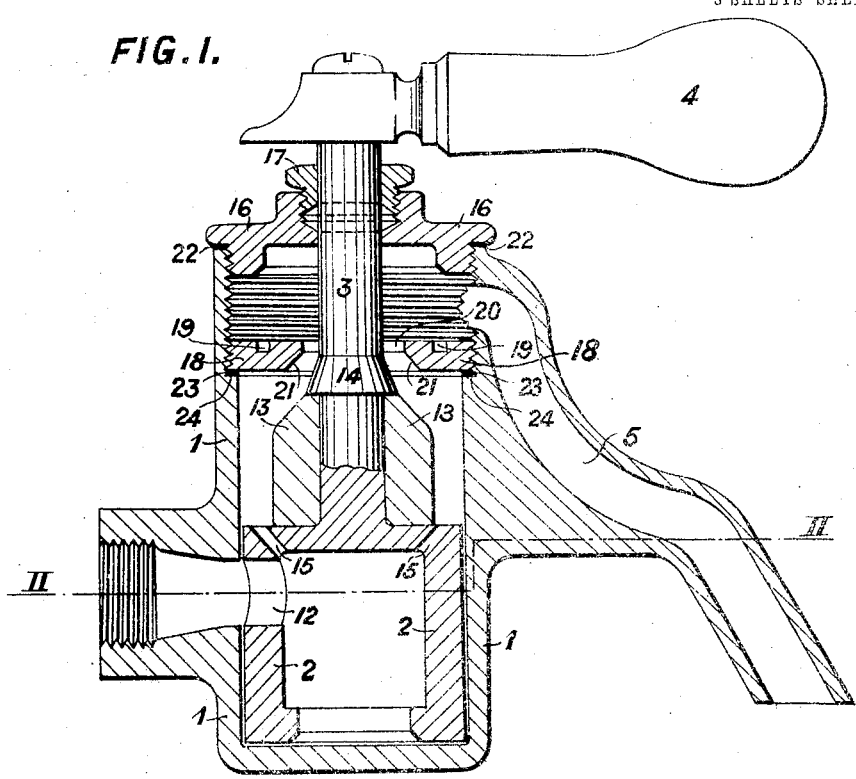

V. E. JOYCE.
MIXING VALVE OR COCK.
APPLICATION FILED FEB. 23, 1911.

1,126,478.

Patented Jan. 26, 1915.

3 SHEETS—SHEET 1.

Witnesses.
B. Dommers
M. A. Darg

Inventor:
Victor Ernest Joyce
By

V. E. JOYCE.
MIXING VALVE OR COCK.
APPLICATION FILED FEB. 23, 1911.

1,126,478.

Patented Jan. 26, 1915.
3 SHEETS—SHEET 2.

Witnesses:
B. Dommers
M. N. Darg

Inventor:
Victor Ernest Joyce.
By Henry Orth Jr.
Atty.

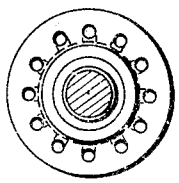
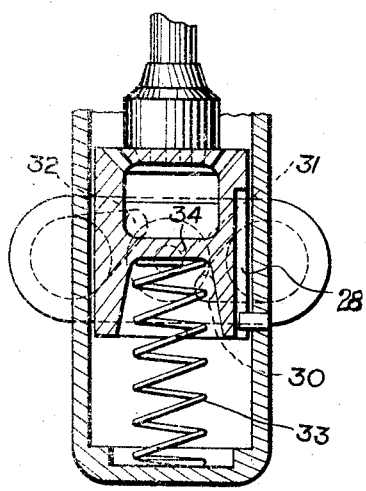
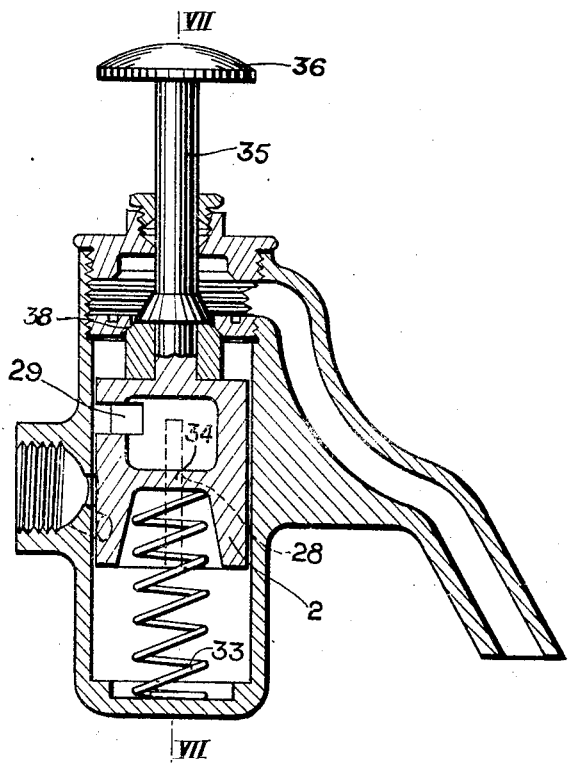

UNITED STATES PATENT OFFICE.

VICTOR ERNEST JOYCE, OF LONDON, ENGLAND, ASSIGNOR TO THE ELECTRIC HEAT STORAGE COMPANY, OF NEW YORK, N. Y.

MIXING VALVE OR COCK.

1,126,478.  Specification of Letters Patent.  Patented Jan. 26, 1915.

Application filed February 23, 1911. Serial No. 610,213.

*To all whom it may concern:*

Be it known that I, VICTOR ERNEST JOYCE, a subject of the King of Great Britain, residing at London, England, have invented new and useful Improvements in and Relating to Mixing Valves or Cocks, of which the following is a specification.

This invention has for its object improvements in and relating to mixing valves or cocks whereby water or other fluids at different temperatures are mixed in the valve and delivered therefrom at the desired temperature, the relative proportion of water or fluid at the various temperatures admitted to the valve being variable by adjusting the position of the valve.

The invention consists in an improved and simple construction of valve of the kind above described whereby the water or fluids at different temperatures are thoroughly mixed in the valve before delivery therefrom at any desired temperature, for instance to a bath or other receptacle, and wherein a perfectly fluid tight joint is made in the valve when in the closed position by means of a conical or like resilient block or piece on the plug which seats against a conical valve seat formed at a suitable point or place in the passage-way for fluid through the mixing valve.

The valve according to this invention may of course be employed for mixing different kinds of liquids or fluids.

According to this invention the mixing valve is so constructed that the fluids enter the valve casing and pass upwardly through the plug and valve casing to the upper portion of the latter, from which upper portion the delivery or discharge outlet takes off, and by being compelled to take a more or less tortuous and upward course through the valve become thoroughly mixed therein before delivery to the bath or other vessel or receptacle. The valve is provided with a hollow plug or piston which is adapted to be moved up and down in a vertical cylindrical casing. The valve plug or piston is guided in its movements by means of a stud in the interior of the valve casing engaging with a groove in the exterior of the plug and it may have a straight up-and-down motion, in which case the groove in the plug would be a straight vertical groove or it may have a combined up-and-down and rotary movement in which case the groove in the exterior of the plug would be cut spirally or partly horizontally and partly spirally. In either arrangement a valve seat is provided between the inlet and discharge ports of the casing, consisting of a horizontal partition piece having a hole through its center through which the spindle of the valve plug passes, the diameter of the hole being sufficiently greater than the diameter of the valve spindle to allow of the fluid passing upwardly around the spindle when the valve is open, and a block of suitable resilient material,—such as dermatin,—surrounding the spindle beneath the valve seat and being adapted when the plug is in its uppermost position to seat itself against the valve seat and close the valve against the passage of fluid. A plurality of fluid supply pipes is connected to inlet ports in the valve casing and the valve plug or piston is provided with a port adapted to be placed in registration with any one or any adjacent two of such inlet ports or to be moved out of registration with any such ports as when the valve is closed. In the form of construction of the valve in which the valve plug or piston has a straight up and down movement only a spiral spring or the like is placed beneath the valve plug and is adapted to normally hold the valve in its closed position.

With valves constructed according to this invention it is not essential that the valve pistons or plugs fit the valve casings tightly. The pistons or plugs in fact are arranged to work freely in the cylindrical casings and with such an arrangement it will be found that the plugs will not seize when they expand due to the passage of hot liquids through them.

The invention is illustrated by the accompanying drawings, in which:—

Figure 2:
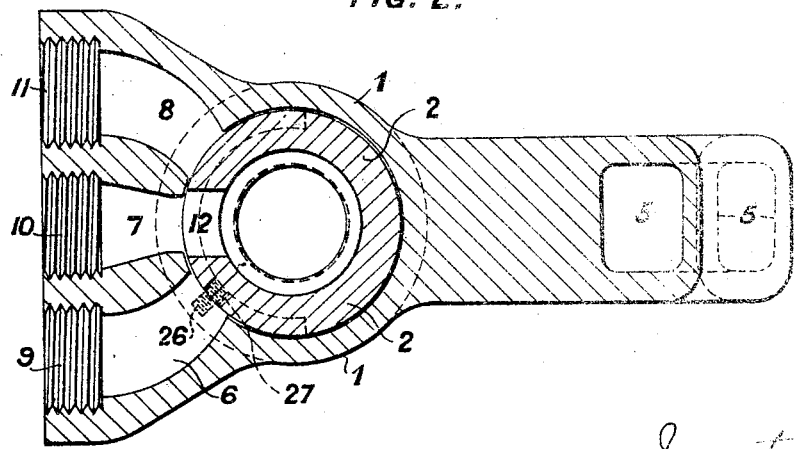
Figure 3:
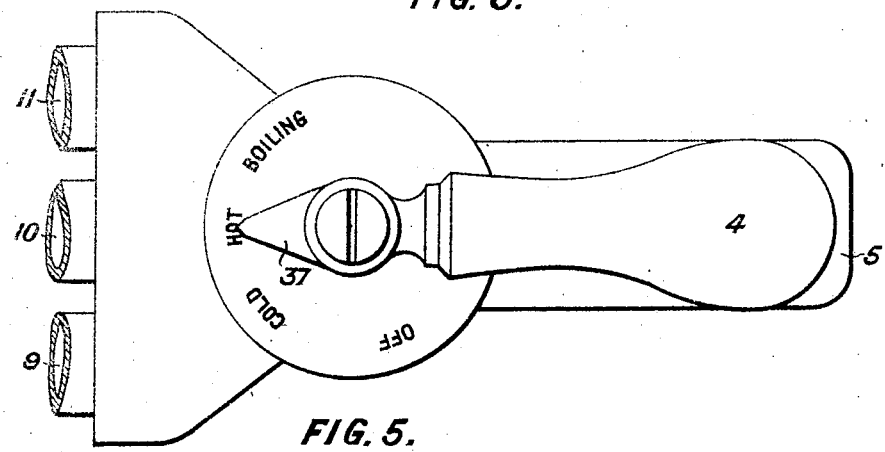
Figure 5:
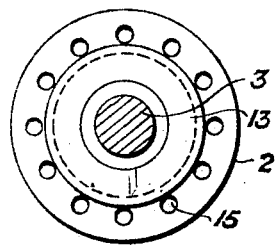
Figure 4:
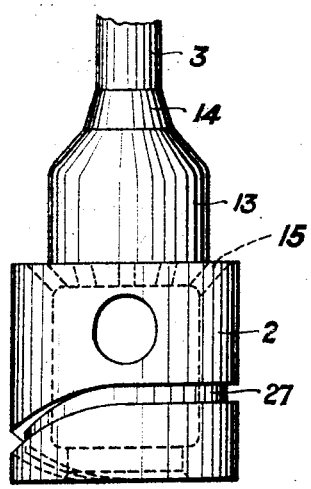

Figure 1 is a sectional elevation of a mixing valve constructed according to this invention; Fig. 2 is a sectional plan taken on the line II—II, Fig. 1; Fig. 3 is a plan of the mixing valve shown in Figs. 1 and 2, this view also showing portions of the fluid inlet pipes; Figs. 4 and 5 are respectively an elevation and a plan of the valve plug of Figs. 1, 2 and 3 removed from its casing; Fig. 6 is a sectional elevation of another form of construction the mixing valve may take; Fig. 7 is a sectional elevation of part of the valve plug and casing of Fig. 6 on the line VII—VII, Fig. 6, and Fig. 8 is a plan of the valve plug of Fig. 6.

Referring to the drawings, the valve shown in Figs. 1 to 5 inclusive is especially intended for use with baths but of course it is not limited to such use, the valve shown in Figs. 6 to 8 inclusive being suitable for lavatory basins. In Figs. 1 to 5, inclusive, 1 is the outer casing of the valve and 2 the valve plunger or plug which is provided with a spindle 3 and operating handle 4. 5 is the discharge or delivery outlet from the valve casing 1, and 6, 7 and 8 are respectively inlet ports for cold, hot and boiling water, 9, 10 and 11 being the supply pipes. 12 is a port through the wall of the hollow valve plug 2 adapted to be placed in the registration with any one or any adjacent two of the ports 6, 7, 8. 13 is a block of suitable resilient material,—such for instance as dermatin,—surrounding the spindle 3. The block 13 is formed conically at its upper end and is kept in place by a collar 14 suitably secured, as by a screw, on the spindle 3. 15, 15 are ports formed in the upper wall or end of the hollow plug 2. The upper end of the valve casing is closed by a screw cap 16, 17 being a packing gland around the spindle 3. 18 is a horizontal partition piece which is adapted to be screwed into position by any suitable means,—as shown by a key or like tool engaging in the holes 19, 19. A hole 20 is provided through the center of the partition piece 18, the diameter of said hole being sufficiently greater than the diameter of the spindle 3 as to leave a passage for fluid around said spindle. The lower portion of the hole 20 is formed conically thereby providing a conical valve seat 21 against which the block 13 is adapted to seat when the valve is closed. A suitable packing ring or gasket 22 is placed between the screw cap 16 and the upper edge of the valve casing 1, and a packing ring 23 is also provided between the underside of the piece 18 and the shoulder 24 in the interior of the valve casing. In the valve according to Figs. 1 to 5 the valve plunger 2 has a rotary as well as an up-and-down movement and is guided in its movement by a pin 26 (see Fig. 2) fixed in the interior of the valve casing 1 engaging in a groove 27 (see Figs. 2 and 4) in the exterior of the hollow plunger 2. This groove may be cut helically throughout its length or may be partly helical and partly horizontal as shown on the drawings.

It will be seen that by operating the handle 4 the valve plug 2 may be rotated, and the port 12 may be put in registration with one only of the ports 6, 7, 8 or with ports 6 and 7 or ports 7 and 8. The horizontal portion of the groove 27 is provided so that the port 12 need not be of a much greater vertical length than the vertical length of the ports 6, 7, 8, and when the handle is operated the plug will not move vertically up or down while the pin 26 is in the horizontal portion of the groove 27, but only when it is in the helical portion of the groove. When the pin 26 is in the helical portion of the groove 27 the operation of the handle 4 in one direction will cause the valve plug 2 to rise while operation of said handle in the other direction will cause the valve plug to move downwardly. When the valve plug is in its uppermost position the block 13 will seat against the valve seat 21 and close the valve, the port 12 at the same time being out of registration with the ports 6, 7, 8.

When the port 12 is in registration with one or two of the inlet ports 6, 7, 8 the fluid from said port or ports will pass into the hollow interior of the valve plug and upwardly through the ports 15, around the block 13 and spindle 3, through the hole 20 into the upper portion of the valve casing, whence it will be discharged by the outlet 5. If the port 12 is in registration with two ports, say 6 and 7, the fluid delivered by the supply pipes will be thoroughly mixed during its upward and somewhat tortuous passage through the plug and valve casing before it is discharged from the valve.

In connection with the valve constructed according to Figs. 1 to 5 an index showing the temperature of the water delivered by the valve in its various positions may be provided on the cap 16, a pointer 37 being provided on the handle 4 to coöperate with the said index.

Referring to Figs. 6, 7 and 8, the construction here shown is such that the valve plug has a straight up and down motion only, the slot 28 being in this case cut vertically in the exterior of the plug 2. The port 29 is in this case made narrow and elongated horizontally while the ports 30, 31 and 32 are arranged at different levels or heights in the casing. In this construction of valve a spring 33 is provided which, by acting against the partition 34 in the valve plug, tends to hold the plug 2 in its uppermost position closing the valve 38. The valve spindle 35 is provided with a knob handle 36 instead of with the lever handle 4 shown in Figs. 1 and 3. The valve is opened to admit fluid to the lavatory basin or other desired receptacle by pressing down the knob 36, and the operation of the valve will be clearly understood without any further detailed description.

What I claim as my invention and desire to secure by Letters Patent of the United States is:—

1. In a mixing valve the combination with the valve casing, a plurality of inlet ports and an outlet port in said casing and a rotatable ported valve plug for controlling the opening and closing of the inlet ports, a valve stem and means for causing said valve plug to rise when it is rotated, of a horizontally disposed partition piece removably mounted in the valve casing between the inlet and outlet ports thereof, a fluid passage through the said partition piece, through which also the valve stem works, a conical valve seat formed at the said passage and a correspondingly formed valve surrounding said spindle and having a conical or like face adapted when the valve plug is in its uppermost position to seat itself against said valve seat and close the mixing valve against the passage of fluid.

2. In a mixing valve the combination with the valve casing, a plurality of inlet ports and an outlet port in said casing, and a hollow valve plug having a top end wall, a port in its side wall adapted to be placed in registration with any one inlet port or any adjacent inlet ports of the valve casing to admit fluid to the interior of the valve plug, and a plurality of ports through the top end wall of said plug adapted to permit the passage of fluid from the hollow interior of the valve to the upper portion of the valve casing, of a horizontally disposed partition piece removably mounted in the valve casing between the inlet and outlet ports thereof, a fluid passage through said partition piece through which also the valve stem works, a conical valve seat formed at the said passage and a resilient stock or piece surrounding said spindle and having a conical face adapted when the valve plug is in its uppermost position to seat itself against said valve seat and close the mixing valve against the passage of fluid.

3. In a mixing valve, the combination of a valve casing provided with a plurality of inlet ports and a discharge port, a valve stem, a hollow plug carried thereby movable in the valve casing and having a top end wall, a port in the side wall of the plug adapted to register with any one or more of the inlet ports of the valve casing to admit fluid to the interior of the plug, a series of ports in the top end wall of the plug to permit the escape of fluid from the hollow interior of the plug to the upper portion of the valve casing, a valve seat in the casing between the plug and the discharge port, and a valve therefor carried by the valve stem adapted to be seated upon the valve seat when the port in the side wall of the plug is not in register with any of the inlet ports.

In testimony whereof I have signed my name to this specification in the presence of two subscribing witnesses.

VICTOR ERNEST JOYCE.

Witnesses:
C. A. A. JENSEN,
R. F. WILLIAMS.